Patented Dec. 18, 1928.

1,695,942

UNITED STATES PATENT OFFICE.

JOHN H. ATWATER, OF JAMESTOWN, NEW YORK.

PROCESS FOR PROTECTING LAWNS.

No Drawing. Application filed January 7, 1927. Serial No. 159,744.

This invention relates to a method of making lawns and briefly aims to provide a method which enables the lawn to be more expeditiously made and which at the same time protects the seeded ground against injury from all harmful causes, the present application being filed in substitution and continuation in part of an application Ser. No. 728,271, filed July 25, 1924.

In making lawns, many difficulties have been experienced, which up to the present time have never been completely or satisfactorily overcome. Certain of these difficulties are, the necessity for protecting the freshly seeded ground from dogs or other animals, from washouts, from baking in the hot sun and from birds or insects or from any other causes which destroy the seed or the young grass before it has a chance to take firm root. Prior to this invention attempts have been made to afford this protection by the use of brush, tar paper, etc., but experience has proven that this is not sufficient and that in spite of all that is done, the grass will come up slowly and lacks uniformity in growth.

The primary object of this invention is to overcome these difficulties by so protecting the newly seeded ground that it cannot be harmed by any of these elements, and furthermore, to cover the earth after the seed has been sown with means which will retain moisture and prevent the drying of the surface under the heat of the sun, thus permitting the making of new lawns in dry as well at wet weather which was never before possible.

The process in question may be described briefly as covering the newly seeded ground with burlap or other coarse textured fabric. The fabric must possess the property of absorbing moisture and of retaining the latter for an appreciable length of time, and is moistened from time to time by sprinkling in the usual manner, in the weaving of which interstices are expressly provided between the warp and the woof, and which are of a size to permit the tender grass sprouts to freely pass therethrough, so that the newly seeded ground is kept dark and moist regardless of the weather, thus creating the most favorable condition for the germination of the seed.

This covering of fabric acts to protect the ground from animals because even though it be walked over, the depths of the resultant foot prints are lessened and the soil is protected against removal or displacement. Even though some soil may cling to the underside of the fabric, it soon drops back so that no material injury to the finished lawn results. Moreover, it is a well known fact that seed pressed into the prepared ground will root more quickly and advantage may be taken of this by walking over, rolling, or otherwise pressing down the fabric covered ground or by walking on the fabric while sprinkling it.

Furthermore, where the lawn is to be made upon a terrace or in any other particularly exposed or difficult location, the fabric covering protects the soil against washouts or other unfavorable action by the elements.

Moreover, by use of the present invention, the seed, which is initially scattered upon the ground, is protected against being eaten by birds, chickens or insects.

The character of the fabric employed, while preferably burlap, can be of other kinds, it being an express requirement, however, that the fabric be possessed of moisture absorbing properties and that its weave or mesh be such as to afford a practically foraminated structure, wherein there are interstices between the warp and woof or otherwise formed of a size to permit tender grass sprouts to freely find their way therethrough. The length of time throughout which the fabric is permitted to remain on the ground may vary, depending upon climatic conditions and the rapidity of germination.

By the provision of a foraminated fabric or other structure, as set forth, it will further be noted that, due to the moisture-retaining properties of the fabric and the uniform spacing or arrangement of the interstices, which latter occur in substantially continuous relation, a resultant uniform growth of the planting is encouraged.

Having thus set forth my invention what I claim as new and for which I desire protection by Letters Patent is:—

1. The process of making lawns consisting in preparing the ground, sowing seed thereon, covering the newly seeded ground with coarse textured fabric having moisture absorbing and retaining properties which rests directly on the ground, and which is woven to provide interstices between the warp and woof of a size to permit tender grass sprouts to freely pass therethrough, keeping said fabric moist and allowing it to remain upon the ground until the seeds germinate and the grass sprouts appear above the ground through said interstices.

2. The process of making lawns consisting in preparing the ground, sowing seed thereon, covering the newly seeded ground with coarse textured fabric having moisture absorbing and retaining properties which rests directly on the ground, and which is woven to provide interstices between the warp and woof of a size to permit tender grass sprouts to freely pass therethrough, keeping said fabric moist, and allowing it to remain upon the ground until the seeds germinate.

In testimony whereof I have affixed my signature.

JOHN H. ATWATER.